Oct. 5, 1954 T. R. FARRIER 2,690,675
FISHING INDICATOR
Filed July 21, 1952 2 Sheets-Sheet 1

Tommy R. Farrier
INVENTOR.

Oct. 5, 1954   T. R. FARRIER   2,690,675
FISHING INDICATOR
Filed July 21, 1952   2 Sheets-Sheet 2
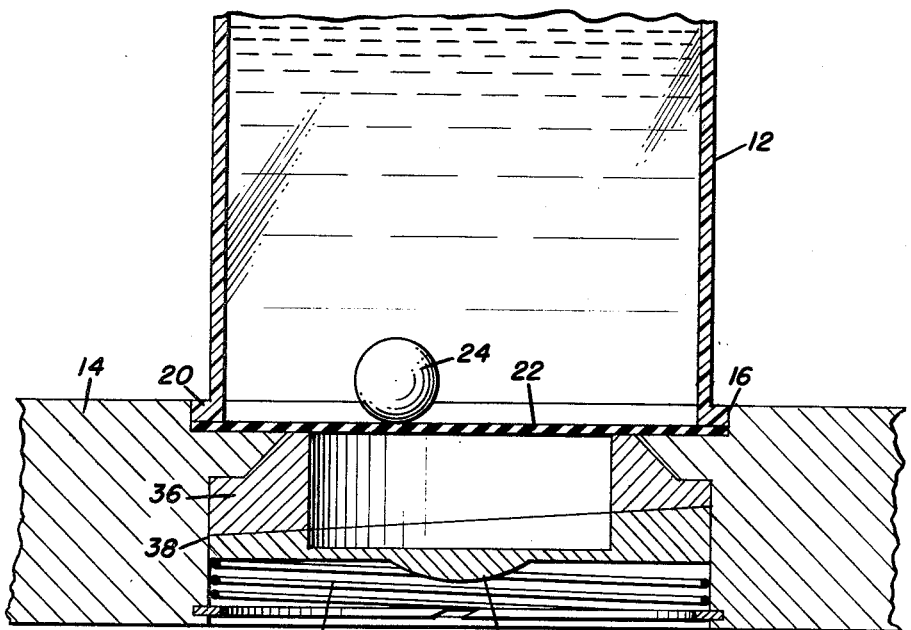
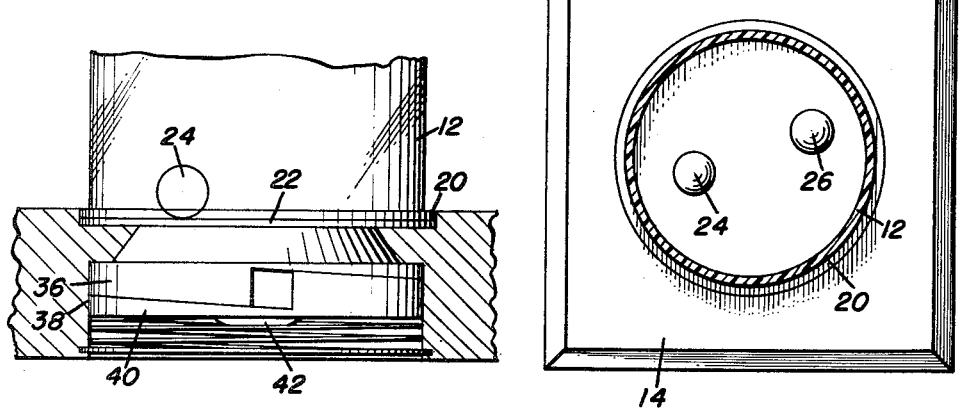
Tommy R. Farrier
INVENTOR.

Patented Oct. 5, 1954

2,690,675

UNITED STATES PATENT OFFICE 2,690,675

FISHING INDICATOR

Tommy R. Farrier, Snyder, Tex.

Application July 21, 1952, Serial No. 300,041

4 Claims. (Cl. 73—384)

This invention relates in general to fishing apparatus, and more specifically to an indicator for determining the possibility of good fishing.

The primary object of this invention is to provide an improved fishing indicator which includes a plurality of floats carried in a sealed container in fluid contained therein, the rise and fall of the floats indicating the possibility of catching fish.

Another object of this invention is to provide an improved indicator which includes a sealed container having fluid disposed therein, said sealed container having floating therein a plurality of floats so designed to float at different barometric pressures, an adjustable diaphragm for varying the pressure within the container so as to change the relative position of the floats.

A further object of this invention is to provide adjusting means for varying the pressure within a sealed container, said adjusting means including a flexible diaphragm closing one end of the container, said diaphragm having associated therewith cam means for urging the same inwardly.

A still further object of this invention is to provide an improved indicator which includes a container filled with fluid and having floats mounted therein, said indicator having means for varying the pressure therein, said means for varying the pressure having associated therewith dial means for accurately setting the pressure within the container.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 3 is an enlarged fragmentary transverse vertical sectional view taken substantially upon the plane indicated by the section line 3—3 of Figure 2 and shows the construction of the means for adjusting the pressure within the container;

Figure 4 is a transverse horizontal sectional view taken substantially upon the plane indicated by the section line 4—4 of Figure 1 and shows the general relationship of the container with respect to the base;

Figure 5 is an enlarged fragmentary transverse vertical sectional view taken through the base of the indicator and showing the manner in which cam means for bearing the pressure on a diaphragm associated with the container are adjustably mounted therein.

Similar characters of reference designate similar or identical elements and portions throughout the specification and throughout the different views of the drawings.

Figure 1:
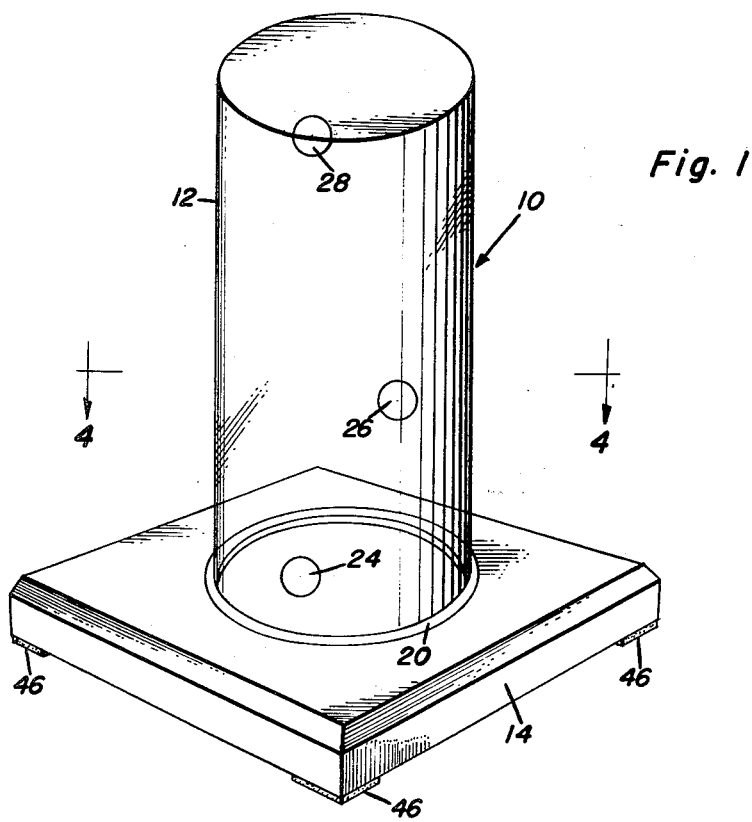
Figure 1 is a perspective view of the fishing indicator which is the subject of this invention and shows the general relationship of the elements thereof.

It has been generally found that when the atmospheric pressure is low that fishing is very good and that when the atmospheric pressure is high, that fishing is very poor. Therefore, it is desirable to provide a suitable indicator which may be conveniently carried for indicating the possibility of catching fish, the indicator being actuated by atmospheric pressure.

Referring now to the drawings in detail, it will be seen that the fishing indicator is referred to in general by the reference numeral 10 and includes an elongated tubular transparent container 12 which is mounted on a base 14. As is best illustrated in Figure 3, the base 14 is provided with a centrally located circular recess 16 in the upper side thereof. Sealed within the recess 16 is an outwardly projecting annular flange 20 at the lower end of the transparent container 12. Also sealed to the annular flange 20 is a transverse diaphragm 22, the diaphragm 22 being, in turn, sealed within the recess 16.

Figure 6:
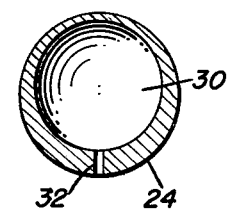
Figure 6 is an enlarged transverse vertical section view taken through the center one of the floats and shows the construction thereof.

The transparent container 12 is filled with a liquid such as water, alcohol, or any other transparent liquid of low viscosity and is free of air. Disposed within the container 12 and floating within the liquid contained therein at various levels are floats 24, 26 and 28. The floats 24, 26 and 28 are of the same general construction and float at different pressures due to their difference in specific gravity when prepared as set out hereinbelow. Inasmuch as the floats are identical, the float illustrated in Figure 6 will be considered to be the float 24. The float 24 is generally spherical in configuration and has a hollow spherical recess 30 therein, the recess 30 being offset from the center of the sphere 24. It will be noted that due to the off-centering of the recess 30 that the bottom portion of the float 24 is heavier than the top thereof in order that the float will float with the bottom portion down. In order that the recess 30 may be conveniently filled with air, the float 24 is provided with a bore 32 through the bottom portion thereof which communicates the recess 30 with the exterior thereof.

It will be understood that all of the floats 24, 26 and 28 are identical to the float 24 and that the recesses 30 are of the same size. It will be seen that if each float is supplied with weights of air and liquids in proportions different from its fellows, the specific gravities of the different floats will be different when emersed in water.

It will be understood that as the barometric pressure increases, the diaphragm 22 will be urged upwardly with the result that the fluid disposed within the container 12 will have the pressure thereon increased. The increase in pressure will result in the compressing of the air disposed within the recesses 30 and the resultant increase of specific gravities of the floats. The increase in specific gravities will cause the floats to be lowered in the fluid disposed within the container 12, if their specific gravities become greater than that of the fluid.

In order that the pressure of the fluid within the container 12 may be compensated for the normal atmospheric pressure of 29.92 inches of mercury, the base 14 is provided with means for adjusting the pressure upon the bottom of the diaphragm 22, the means being referred to in general by the reference numeral 34. The adjusting means 34 includes a fixed cam member 36 which is disposed in the upper portion of an enlarged recess 38 in the bottom of the base 14, the recess 38 communicating with the recess 16 and opening into the bottom of the diaphragm 22. The fixed cam 36 is secured to the diaphragm 22 and upward movement thereof is imparted directly to the diaphragm 22. Threadedly engaged in the lower portion of the recess 38, which is internally threaded, is an adjustable cam member 40. The cam member 40 has complementary cam surfaces engaged with the fixed cam member 36 and is adapted to urge the same upwardly upon rotation of the same within the recess 38.

Figure 2:
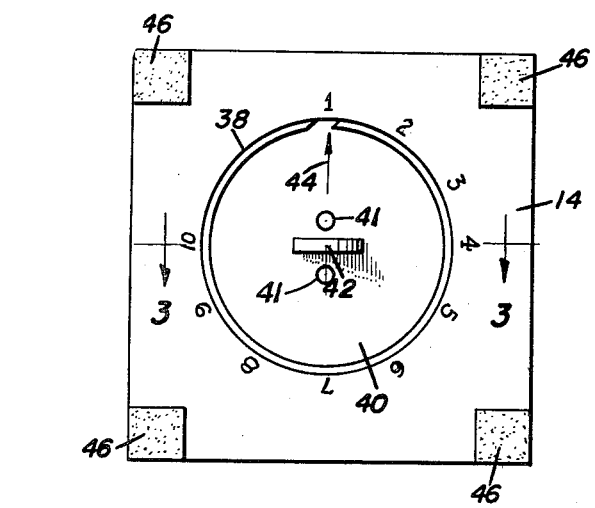
Figure 2 is a bottom plan view of the base of the indicator of Figure 1 and shows the construction of means for varying the pressure within the container associated therewith.

Although the cam member 40 underlies the diaphragm 22, the diaphragm 22 is communicated with the atmosphere through the provision of openings 41 through the cam member 40, as best illustrated in Figure 2.

In order that the pressure of the fluid within the container 12 may be compensated to the normal atmospheric pressure, the adjustable cam member 40 is rotated by twisting a knob 42 projecting downwardly from the underside thereof. Movement of the knob 42 screws the adjustable cam member 40 into the recess 38 and causes upward movement of the diaphragm 22 to increase the pressure within the container 12.

Referring now to Figure 2 in particular, it will be seen that after the pressure within the container has been set to the normal atmospheric pressure, the underside of the adjustable cam member 40 is provided with an arrow 44 which is adapted to be aligned with indicia on the bottom of the base 14 surrounding the recess 38. When it is desired to utilize the indicator 10 at higher altitudes, the arrow 44 is turned so as to be in alignment with the indicia marking on the bottom of the base 14 for the particular altitude.

In order that the indicator 10 may be conveniently rested upon an article of furniture or other valuable furnishings, the base 14 has secured to the underside thereof pads 46. It will be understood that the pads 46 are positioned at the corners of the base 14 and are formed of felt or other non-scratching material.

It will be understood that the floats 24, 26 and 28 are positioned so that when the pressure within the container 12 is at the normal atmospheric pressure the float 24 is disposed adjacent the bottom of the container while the float 28 is at the top thereof and the float 26 is positioned intermediate the ends of the container in the process of moving from the top to the bottom or vice versa as illustrated in Figure 1. If all the floats are on the bottom the fishing will be excellent whereas if all three floats are at the top of the container the fishing will be poor. If one float only is on top fishing will be good and if two floats are at the top fishing will be fair. It will be seen that inasmuch as the possibility of catching fish varies indirectly with the atmospheric pressure, that the reduction in atmospheric pressure will cause the floats to rise to the top and indicate that fishing will be poor.

While the illustrated form of the indicator is preferred, it will be understood that, if it is so desired, the indicator may be in the form of a tube with the adjusting mechanism contained in one end. Such an indicator would be readily portable.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A fishing indicator comprising a sealed container having fluid disposed therein, a plurality of floats disposed within said fluid, each float having the property that its over-all density decreases and increases on increase and decrease, respectively, of fluid pressure therein, the density of each float having at least two different values of density such that the density of the float is less than the density of the fluid at one range of pressures exerted thereon, but is greater than the density of the fluid at another range of pressures, each float having a density different from the other floats when all floats are subjected to the same pressure, a diaphragm closing one end of said container whereby external pressures may be transmitted to said fluid, said container being mounted on a base with said diaphragm being disposed within said base, adjustable means carried by said base engaging said diaphragm for selectively varying the pressure of said fluid.

2. A fishing indicator comprising a sealed container having fluid disposed therein, a plurality of floats disposed within said fluid, each float having the property that its over-all density decreases and increases on increase and decrease, respectively, of fluid pressure therein, the density of each float having at least two different values of density such that the density of the float is less than the density of the fluid at one range of pressures exerted thereon, but is greater than the density of the fluid at another range of pressures, each float having a density different from the other floats when all floats are subjected to the same pressure, a diaphragm closing one end of said container whereby external pressures may be transmitted to said fluid, said container being mounted on a base with said diaphragm being disposed within said base, adjustable means carried by said base engaging said diaphragm for selectively varying the pressure of said fluid, indicating means adapted to indicate the position of the adjustable means.

3. A fishing indicator comprising a sealed container having fluid disposed therein, a plurality of floats disposed within said fluid, each float having the property that its over-all density decreases and increases on increase and decrease, respectively, of fluid pressure thereon, the density of each float having at least two different values of density such that the density of the float is less than the density of the fluid in one range of pressures exerted thereon, but is greater than the density of the fluid in other ranges of pressures, each fluid having a density different from the other floats when all floats are subjected to the same pressure, said sealed container being mounted on a base, a flexible diaphragm in said base closing said container, a fixed cam on said diaphragm, an adjustably positionable cam carried by said base engaging said fixed cam and adapted to move said diaphragm through said fixed cam to vary the pressure of the fluid in the container to an amount depending upon the position of the adjustment, and said fluid being adapted to be exposed to the effect of a pressure to be measured.

4. A fishing indicator comprising a sealed container having fluid disposed therein, a plurality of floats disposed within said fluid, each float having the property that its over-all density decreases and increases on increase and decrease, respectively, of fluid pressure thereon, the density of each float having at least two different values of density such that the density of the float is less than the density of the fluid in one range of pressures exerted thereon, but is greater than the density of the fluid in other ranges of pressures, each fluid having a density different from the other floats when all floats are subjected to the same pressure, said sealed container being mounted on a base, a flexible diaphragm in said base closing said container, a fixed cam on said diaphragm, an adjustably positionable cam carried by said base engaging said fixed cam and adapted to move said diaphragm through said fixed cam to vary the pressure of the fluid in the container to an amount depending upon the position of the adjustment, indicating means adapted to indicate the position of adjustment of the second mentioned cam, and said fluid being adapted to be exposed to the effect of a pressure to be measured.

References Cited in the file of this patent

UNITED STATES PATENTS

| Number | Name | Date |
|---|---|---|
| 1,159,889 | Benjamin | Nov. 9, 1915 |
| 1,646,968 | Louder | Oct. 25, 1927 |
| 1,952,897 | Spencer | Mar. 27, 1934 |
| 2,439,342 | Hudson | Apr. 6, 1948 |

FOREIGN PATENTS

| Number | Country | Date |
|---|---|---|
| 16,054 | Great Britain | Sept. 3, 1885 |